(12) United States Patent
Jiang

(10) Patent No.: US 9,225,142 B2
(45) Date of Patent: *Dec. 29, 2015

(54) FIBER AMPLIFIER WITH MULTI SECTION CORE

(71) Applicant: AdValue Photonics, Inc., Tucson, AZ (US)

(72) Inventor: Shibin Jiang, Tucson, AZ (US)

(73) Assignee: AdValue Photonics, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/612,045

(22) Filed: Feb. 2, 2015

(65) Prior Publication Data

US 2015/0155678 A1    Jun. 4, 2015

Related U.S. Application Data

(60) Continuation-in-part of application No. 14/165,388, filed on Jan. 27, 2014, now Pat. No. 8,948,217, and a division of application No. 12/257,336, filed on Oct. 23, 2008, now Pat. No. 8,639,080.

(51) Int. Cl.
*H01S 3/067* (2006.01)
*G02B 6/02* (2006.01)
*G02B 6/036* (2006.01)

(52) U.S. Cl.
CPC ........ *H01S 3/06754* (2013.01); *G02B 6/02338* (2013.01); *G02B 6/02395* (2013.01); *H01S 3/06708* (2013.01); *H01S 3/06716* (2013.01); *G02B 6/02042* (2013.01); *G02B 6/036* (2013.01); *H01S 3/06729* (2013.01); *H01S 3/06737* (2013.01)

(58) Field of Classification Search
CPC ............ H01S 3/06716; H01S 3/06754; H01S 3/06708; H01S 3/06737; H01S 3/06729; G02B 6/02338; G02B 6/02042; G02B 6/036
See application file for complete search history.

(56) References Cited

U.S. PATENT DOCUMENTS

| | | | |
|---|---|---|---|
| 4,829,529 A | 5/1989 | Kafka | |
| 5,305,335 A * | 4/1994 | Ball et al. | 372/6 |
| 5,566,196 A * | 10/1996 | Scifres | 372/6 |
| 5,875,203 A | 2/1999 | Wagener et al. | |
| 6,043,930 A | 3/2000 | Inagaki | |
| 6,275,512 B1 | 8/2001 | Fermann | |
| 7,791,046 B2 | 9/2010 | Liane et al. | |
| 8,639,080 B2 * | 1/2014 | Jiang | 385/126 |
| 8,948,217 B2 * | 2/2015 | Jiang | 372/6 |
| 2009/0080472 A1 | 3/2009 | Yao et al. | |

* cited by examiner

*Primary Examiner* — Xinning Niu
(74) *Attorney, Agent, or Firm* — Dale F. Regelman; Quarles & Brady LLP

(57) ABSTRACT

A fiber amplifier is disclosed having a core region embedded within a cladding. The core region further has multiple sections, each of which is doped with at least one rare-earth ion.

5 Claims, 5 Drawing Sheets

FIBER AMPLIFIER WITH MULTI SECTION CORE

CROSS REFERENCE TO RELATED APPLICATIONS

This application is a Continuation-In-Part of U.S. patent application Ser. No. 14/165,388, filed Jan. 27, 2014, now U.S. Pat. No. 8,948,217, which claims priority from U.S. patent application Ser. No. 12/257,336 filed Oct. 23, 2008, now U.S. Pat. No. 8,639,080, which are incorporated herein.

FIELD OF THE INVENTION

This invention relates to fiber amplifiers comprising multiple core sections, which, when used, cause a laser energy to be amplified simultaneously from more than one lasing ion and/or from more than one electronic transition.

BACKGROUND OF THE INVENTION

Generally speaking, an optical fiber is a fiber of glass or plastic capable of carrying light along its length and typically comprising a core section surrounded in a cladding, as illustrated in FIG. 1. An optical beam is propagated through the length of fiber 100 via a core 102, confined therein by a cladding 104, which has a lower refractive index than the core.

SUMMARY

In one implementation, a fiber amplifier is disclosed having a core region embedded within a cladding. The core region further has multiple sections, each of which is doped with at least one rare-earth ion.

In another implementation, an fiber amplifier is disclosed having multiple core regions embedded within a cladding. Each core region further has multiple sections, each of which is doped with at least one rare-earth ion.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION OF THE PREFERRED EMBODIMENTS

This invention is described in preferred embodiments in the following description with reference to the FIGs, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Multimode fibers support multiple transverse modes, whereas single mode fibers support only one. Typically, multimode fibers are used for communication links over short distances or where high power transmissions are desired. In contrast, single mode fibers are used for long-distance communication links. The relationship between the mode of fiber, the core, and the optical beam is given by the following equation:

$$V = 2\pi \times NA \times a / \lambda$$

where NA is the numerical aperture, a is the radius of the core, and $\lambda$ is the wavelength of the optical beam. When V is less than or equal to 2.405, the fiber is a single mode fiber. Otherwise, it is a multimode fiber.

When doped with rare-earth ions, such as neodymium or ytterbium, optical fibers can be used as the gain medium in fiber amplifiers. Such fiber is generally referred to as a gain fiber and the rare-earth ions are doped in the core and/or the cladding. Different laser wavelengths are generated from fibers with different doping ions. For example, approximately 1 and 1.3 microns are achieved with neodymium doped fibers, 1.55 and 2.7 microns from erbium doped fibers, 1 micron from ytterbium doped fibers, and 2 microns from thulium and/or holmium doped fibers.

Figure 1:
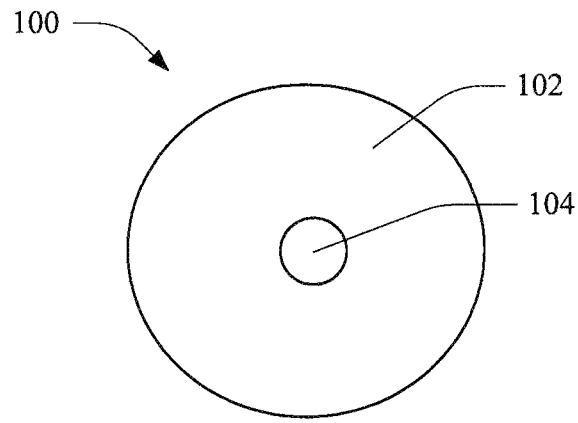
FIG. 1 is a cross sectional view of an exemplary embodiment of an optical fiber having a core and a single cladding.
Figure 2:
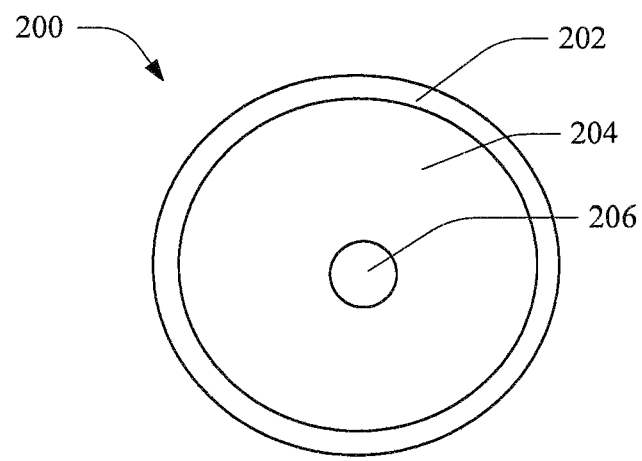
FIG. 2 is a cross sectional view of an exemplary embodiment of an optical fiber having a double cladding.

Different types of gain fibers are designed for use in different fiber lasers, the characteristics of the gain fiber effecting the resulting fiber laser. For example, the use of a double cladding gain fiber increases the output power of a fiber laser. Several existing patents focus on this relationship by attempting to affect the quality and nature of fiber lasers through the development of the gain fiber. By way of example, U.S. Pat. No. 4,829,529, issued to Kafka provides a single mode fiber laser pumped by a coherent high power laser diode source. Kafka attempts to address the issue that the small diameter of single mode fibers limits the ability to couple such fibers to high powered coherent laser diode sources, resulting in low powered lasers, whereas multimode fibers are not so limited, but the resulting lasers have poor beam quality output. Specifically, Kafka discloses laser diode pumped fiber lasers with double cladding. FIG. 2 provides an exemplary embodiment of a fiber 200 as used in Kafka having a double cladding where a core 206 embedded within an inner cladding 204 and an outer cladding 202. The optical fiber used has rare-earth ions doped into the core to provide an active gain medium. A multimode pump laser is coupled to the inner cladding to increase the pump power and excite the rare-earth ions in the core of the fiber. The larger cross section of the inner cladding, in comparison to the core, allows the multimode laser to be coupled to a single mode fiber. As a result, the high pump power of the inner cladding compared to the core pump produces a fiber laser having high output.

Figure 3:
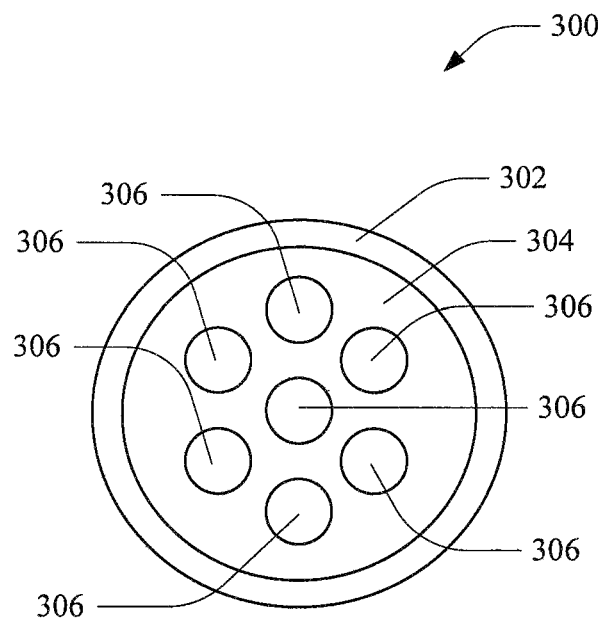
FIG. 3 is a cross sectional view of an exemplary embodiment of an optical fiber having multiple cores.

By way of another example, U.S. Pat. No. 5,566,196, issued to Scifres, attempts to provide an optical fiber laser or amplifier medium using multimode fibers and having an increased output power without producing nonlinear optical effects such as Brillouin scattering. The fiber lasers and amplifiers of Scifres employ optical fibers with two or more generally parallel, nonconcentric doped core regions, each of which is capable of gain or lasing when optically pumped. An exemplary optical gain fiber according to Scifres is illustrated in FIG. 3. The fiber 300 may be single clad or double clad, the single clad fiber having only the inner cladding 304 where as the double clad fiber additionally has the outer cladding 302. Multiple cores 306 may be embedded in a common cladding region, such as inner cladding 304, or in separate cladding regions. The use of multiple cores spreads the light over a larger area of the fiber, compared with a single mode fiber, and thereby reducing or eliminating the non linear optical effects that would otherwise occur at high light intensities.

The cores of the gain fibers of Kafka and Scifries are formed with a relatively uniform area. The laser is generated and/or amplified by one or more rare-earth ions doped into the core of the fiber. Other ions may be used to transfer energy to the lasing ions. For example, ytterbium ions are sometimes doped into an erbium doped fiber. The resulting lasing ions are erbium and receive energy transferred from the ytterbium after absorbing the pump. However, by forming gain fibers with a relatively uniform area, only one wavelength is generated from each fiber. In other words, the laser only occurs in one transition from the upper level to the lower level from one lasing ion.

Clearly, the development of fiber lasers and fiber amplifiers, such as those described in either Kafka or Scifres, would benefit from optical fibers having non uniform cores, each core section being doped with different rare-earth ions and resulting in a gain fiber capable of generating more than one wavelength.

Figure 4:
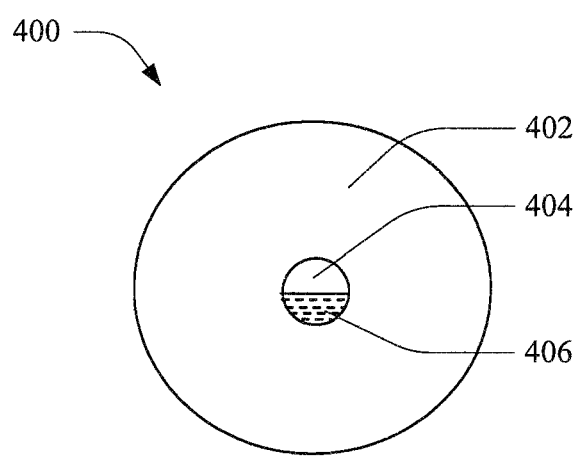
FIG. 4 is a cross sectional view of an exemplary embodiment of an optical fiber having two core sections.
Figure 5A:
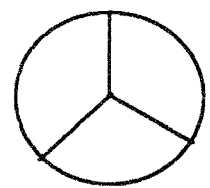
FIGS. 5A-5F are cross sectional views of an exemplary embodiments of the configurations of a core having multiple sections.
Figure 5B:
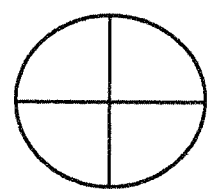
Figure 5C:
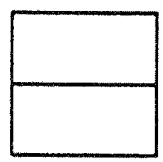
Figure 5D:
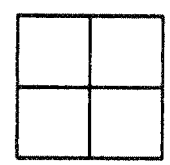
Figure 5E:
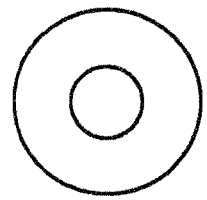
Figure 5F:
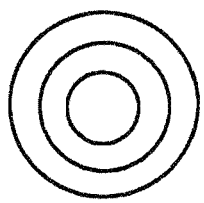

Turning to the Figures, FIG. 4 depicts a cross sectional view of an exemplary embodiment of an optical fiber 400 having core sections 404 and 406, surrounded by a cladding 402. A person of ordinary skill in the art will realize that, although FIG. 4 depicts an optical fiber having two core sections, the following discussion is equally applicable to optical fibers having more than two core sections.

In certain embodiments, by dividing the core into sections, each core section 404 and 406 are doped with different rare-earth ions. Thus, by way of example, core section 404 may generate a different wavelength when used in a fiber laser than core section 406.

In certain embodiments, each core section 404 and 406 comprise a same doping rare earth ion, but in differing weight percent loadings. In certain embodiments, each core section 404 and 406 comprises a same plurality of rare earth dopants, but each core section comprises that same plurality of dopants at differing weight percent loadings.

In other embodiments, core sections 404 and 406 may be made from different glass host materials. By way of example, and not by way of limitation, core section 404 can be silicate glass while core section 406 is phosphate glass. In yet other embodiments, core sections 404 and 406 may be doped with the same rare-earth ions but with different doping concentrations, thus resulting in different spectroscopic properties and, therefore, affecting the performance of a fiber laser.

As stated, the present discussion is applicable to optical fibers having any number of core sections. Further, the core sections can have a variety of configurations. FIGS. 5A-5F presents cross sectional views of exemplary embodiments of different configurations of segmented cores. A person of ordinary skill in the art will realize that FIGS. 5A-5F are provided by ways of illustration, and not by way of limitations, and that the present discussion encompasses configurations other than those depicted in FIGS. 5A-5F.

In one embodiment, although the core is formed having multiple discrete sections, from the point of view of a propagating optical beam, the sections form a single mode guide. In such an embodiment, each section of the core may be formed from glass having approximately the same refractive index. In other words, the difference between the refractive indices of the various sections is much smaller than the difference between the refractive index of the core and that of the cladding.

A person of ordinary skill in the art will realize that although the present discussion focuses on single mode fibers and although a single mode fiber will be sufficient for most applications, the present discussion is equally applicable to multimode fibers. In such an embodiment, a cross sectional view of an individual multi section core of a multimode fiber will appear the same as a cross sectional view of a multi section core of a single mode fiber. However, the relationship between the mode of fiber, the core, and the optical beam is no longer designated by the equation:

$$V = 2\pi \times NA \times a/\lambda$$

By way of example, an optical fiber having a multi section core according to the present discussion may be fabricated by doping one core glass with erbium ions, having a refractive index of 1.50 at 1.55 microns. A second core glass may be doped with thulium ions, having a refractive index of 1.50+/−0.0005 at 1.55 microns. Thus, the difference between the two core glasses is less than 0.001. The cladding class may be fabricated having a refractive index of 1.4935, resulting in a numerical aperture of 0.14.

Each core glass may be ground until they form semi-cylindrical rods, such that when the grounded surfaces are disposed in contact with one another, the two core glasses form a cylinder. The ground surface of each core glass may then be polished.

Figure 6:
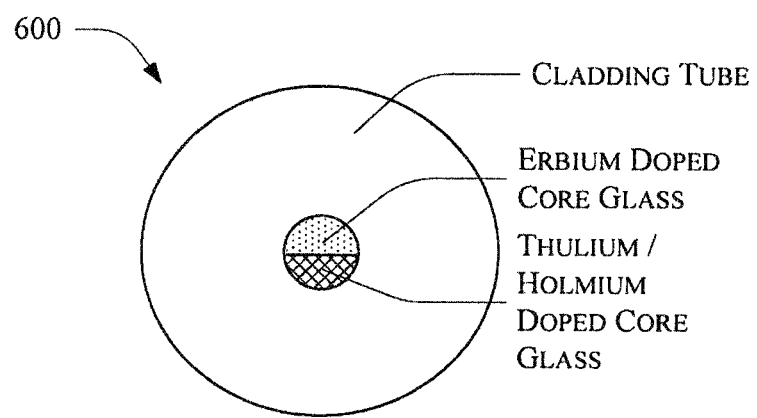
FIG. 6 is a cross sectional view of an exemplary embodiment of an optical fiber perform.

A cladding glass tube can be fabricated from the cladding glass such that the inner diameter of the tube equals the outer diameter of the core glass, the outer diameter of the cladding being dependent upon the size of the fiber. Both the inner and outer diameters are polished. Once done, the semi-cylindrical rods of erbium doped glass and thulium doped class are inserted into the inner diameter of the cladding glass tube to form the fiber preform. FIG. 6 is a cross sectional view of an exemplary fiber perform 600 fabricated according to the present discussion.

The fiber preform is placed into a fiber drawing tower. During the fiber drawing process, the two core glasses are physically bonded to form the single mode core area.

Figure 7:
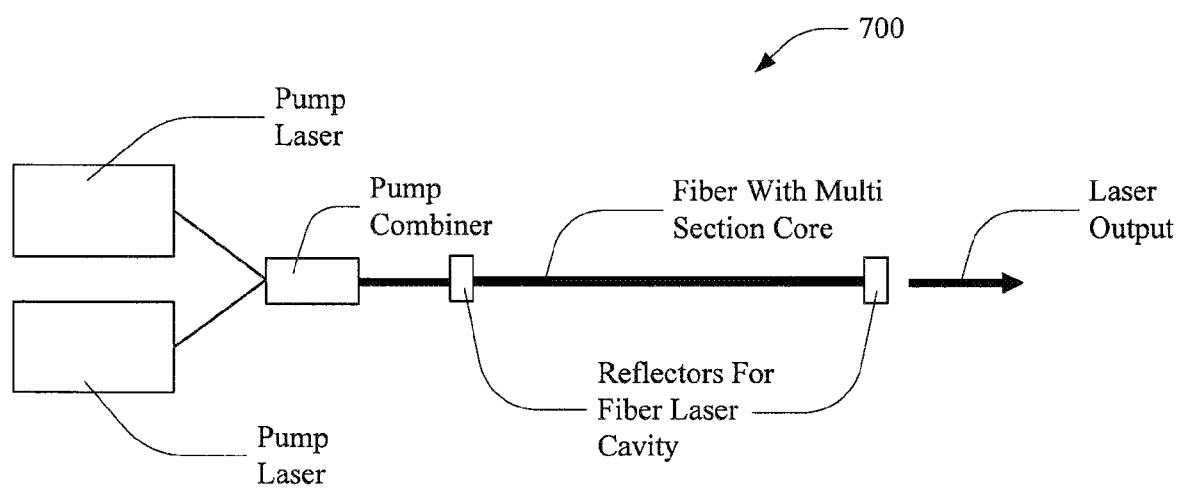
FIG. 7 is a schematic depiction of an exemplary embodiment of a fiber laser using an optical fiber having multiple cores according to the present discussion.

As stated, an optical fiber having a multi section core according to the present discussion can be used to generate multiple laser wavelengths simultaneously. For example, using the fiber of FIG. 6, a 1.55 micron fiber laser can be generated in the erbium doped core section and a near 2 micron fiber laser in the thulium doped core section. An exemplary embodiment of a fiber laser 700 using such an optical fiber is depicted in FIG. 7.

The ability to generate multiple laser wavelengths in the same single mode core is highly beneficial. By way of example, and not by way of limitation, one wavelength can be used as the pump source and the other as the probe wavelength in a pump and probe experiment. As another example, two wavelengths can be used to generate a new laser wavelength through a nonlinear process such as, for example, different frequency generation, frequency summing, and frequency doubling.

A fiber having a multi section core can also be used to generate an ultra short pulse fiber laser. The pulse width of a short pulse fiber laser is limited by the bandwidth of the gain medium. By doping multiple rare-earth ions into a fiber having a multi section core, gain bandwidth can be effectively extended thereby allowing an extremely short pulse fiber laser to be achieved.

A fiber according to the present discussion can additionally be used to generate extremely broad band amplified spontaneous emission ("ASE") source. By way of example, and not by way of limitation, one section of a bisected core can be doped with thulium ions and other with holmium ions. As is known by those of ordinary skill in the art, thulium emits emissions from 1.7 to 1.9 microns and holmium from 1.9 to 2.1 microns. By doping the stated sections with thulium ions and holmium ions respectively, an ASE source with emissions from 1.7 to 2.1 microns can be generated.

While the preferred embodiments of the present invention have been illustrated in detail, it should be apparent that modifications and adaptations to those embodiments may occur to one skilled in the art without departing from the scope of the present invention.

I claim:

1. A fiber amplifier, comprising:
a laser optical fiber comprising (N) core sections, wherein (N) is 2, 3, or 4;
a first single mode core region embedded within a cladding, the first single mode core region having two non-concentric core glass sections, wherein:
each of the core glass sections is doped with a rare-earth ion;
each core glass section comprises a semi-cylindrical rod having a ground surface; and
the ground surfaces are disposed in direct physical contact with one another such that the two core glass sections form a cylinder, such that each core glass section is in continuous contact with the other core glass section along a length of the fiber.

2. The fiber amplifier of claim 1, wherein one core glass section is doped with a first rare-earth ion and the other core glass section is doped with a second rare-earth ion, the first rare-earth ion being different from the second rare earth ion.

3. The fiber amplifier of claim 1, wherein one core glass section is doped with a first doping concentration and the other core glass section is doped with a second doping concentration, the first doping concentration being different from the second doping concentration.

4. The fiber amplifier of claim 1, wherein one core glass section is of a first glass host and the other section is of a second glass host, the first glass host being different from the second glass host.

5. The fiber amplifier of claim 1, wherein the laser optical fiber further comprises a second single mode core region, the second single mode core region having a plurality of sections, wherein each of the plurality of sections is doped with a rare-earth ion.

* * * * *